(12) United States Patent
Rutschmann et al.

(10) Patent No.: US 8,104,967 B2
(45) Date of Patent: Jan. 31, 2012

(54) DEVICE FOR ENCAPSULATING THE MAIN BEARING OF A CRANKSHAFT

(75) Inventors: Erwin Rutschmann, Tiefenbronn (DE); Willi Schultz, Neulingen (DE); Thorsten Wieg, Pforzheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 661 days.

(21) Appl. No.: 12/276,466

(22) Filed: Nov. 24, 2008

(65) Prior Publication Data

US 2009/0136171 A1 May 28, 2009

(30) Foreign Application Priority Data

Nov. 23, 2007 (DE) .......................... 10 2007 056 449

(51) Int. Cl.
*F16C 9/00* (2006.01)
(52) U.S. Cl. ........................................ 384/294; 384/429
(58) Field of Classification Search .................. 384/288, 384/291, 294, 429–434; 123/195 R
See application file for complete search history.

(56) References Cited

U.S. PATENT DOCUMENTS

| | | | |
|---|---|---|---|
| 2,463,235 A | | 3/1949 | Andrews |
| 3,202,463 A | * | 8/1965 | Fatt ................................ 384/433 |
| 3,929,394 A | * | 12/1975 | Hackett et al. ................. 384/398 |
| 4,265,495 A | * | 5/1981 | Backlin .......................... 384/429 |
| 4,362,341 A | * | 12/1982 | Matsumoto et al. ........... 384/220 |
| 4,651,691 A | * | 3/1987 | Ogawa ....................... 123/195 H |
| 4,770,547 A | * | 9/1988 | New ............................... 384/429 |
| 5,711,614 A | | 1/1998 | Wuest et al. |

FOREIGN PATENT DOCUMENTS

| | | |
|---|---|---|
| DE | 158 815 | 1/1904 |
| DE | 1 264 905 | 3/1968 |
| DE | 1 400 490 | 11/1968 |
| DE | 2 250 947 | 5/1974 |
| DE | 3730166 A1 * | 3/1989 |
| DE | 195 37 192 C1 | 1/1997 |
| DE | 199 52 097 A1 | 5/2001 |
| GB | 225 459 | 12/1924 |
| GB | 823 613 | 11/1959 |

OTHER PUBLICATIONS

German Patent and Trademark Office Search Report, dated Jul. 1, 2008.

* cited by examiner

*Primary Examiner* — Thomas R Hannon

(57) ABSTRACT

A device encapsulates a main bearing of a crankshaft. The main bearing is supplied with oil via an oil supply groove. The device has a bearing seat for the main bearing and on its sides which face toward the crank webs of the crankshaft, has oil channels which are open in the direction of the main bearing and in the direction of the crankshaft webs. In the device, the oil channels are sealed off in the direction of the crankshaft webs by sealing disks which are fastened to the bearing seat.

18 Claims, 4 Drawing Sheets

DEVICE FOR ENCAPSULATING THE MAIN BEARING OF A CRANKSHAFT

CROSS-REFERENCE TO RELATED APPLICATION

This application claims the priority, under 35 U.S.C. §119, of German application DE 10 2007 056 449.1, filed Nov. 23, 2007; the prior application is herewith incorporated by reference in its entirety.

BACKGROUND OF THE INVENTION

Field of the Invention

The invention relates to a device for encapsulating a main bearing of a crankshaft. The main bearing is supplied with oil via an oil supply groove. A bearing seat for the main bearing is provided, and on its sides which face toward the crank webs of the crankshaft, has oil channels which are open in a direction of the main bearing and in a direction of the crankshaft webs.

A device of this type is known from German patent DE 195 37 192 C1, corresponding to U.S. Pat. No. 5,711,614 A. The device is used in a multi-cylinder internal combustion engine in order to conduct the oil which emerges out of the bearing points of the main bearing having been centrifuged from the rotating crankshaft webs. Oil channels are thus formed on the side surfaces of the bearing seat. This prevents intense foaming of the oil, since the oil which is centrifuged from the crankshafts is directly intercepted and conducted. The residence time of the oil in the crankcase is reduced, such that the oil flows back more quickly into the oil sump, and splashing losses are reduced.

Published, non-prosecuted German patent application DE 199 52 097 A1 describes a sealing device for sealing off a bearing seat with respect to a crankshaft. The bearing seat, which is concentric with respect to the rotational axis of the crankshaft, is provided with a groove in which are disposed an annular spring element and a sealing ring which bears against the crankshaft. The annular spring element and the sealing ring are each provided with a parting point in order to facilitate their assembly. The sealing ring is composed in particular of ceramic, metal or rubber, with it being possible to realize lower friction values by using a special material. In order to permit a discharge of the oil, a drainage duct extends downward from the groove with respect to the installed position, with the drainage duct being shielded from the crankshaft by a faceplate.

The suction of lubricating oil out of the main bearing of a crankshaft in a compressor for refrigeration machines is known from published, non-prosecuted German patent application DE 2 250 947 A. There, the supplied oil is sucked out of the main bearing again via a central groove and a vacuum line which adjoins the latter.

SUMMARY OF THE INVENTION

It is accordingly an object of the invention to provide a device for encapsulating a main bearing of a crankshaft that overcomes the above-mentioned disadvantages of the prior art devices of this general type, in which oil emerging out of the main bearing can be discharged in a targeted manner without being centrifuged around in the crankcase.

With the foregoing and other objects in view there is provided, in accordance with the invention, a device for encapsulating a main bearing of a crankshaft. The device contains a bearing seat for receiving the main bearing. The bearing seat has an oil supply groove for supplying oil to the main bearing. The main bearing has sides facing toward crank webs of the crankshaft. The sides have oil channels opening in a direction of the main bearing and in a direction of the crankshaft webs. Sealing disks cover the oil channels in the direction of the crankshaft webs and fastened to the bearing seat.

The object is achieved in a device of the type specified in the introduction in that the oil channels are covered in the direction of the crankshaft webs by sealing disks which are fastened to the bearing seat.

The sealing disks serve to form a closed space in the direction of the crankshaft webs, such that oil emerging out of the main bearing cannot pass into the crankcase, but rather passes along those sides of the sealing disks which face toward the main bearing.

For assembly reasons, the respective sealing disk extends in particular over a semicircle. Two semicircular sealing disks therefore cover the radially encircling oil channel on each side of the main bearing.

The respective sealing disk is preferably held in the bearing seat. It is considered to be particularly advantageous if this is provided in that the respective sealing disk which extends over a semicircle is held in the region of its semicircle ends in the bearing seat. The fixing takes place for example by virtue of the respective sealing disk having, in the region of its semicircle ends, lugs which engage into grooves in a parting plane of the bearing seat. The two bearing seat parts of the bearing seat thereby hold the two semicircular sealing disks between them, and clamp their lugs.

According to an alternative configuration, the two sealing disks which are assigned to one bearing half are formed in one piece, in the manner of a double clip.

The respective sealing disk may also be configured so as to have at least one lug, with the respective lug engaging into a hole, in particular a bore of the bearing seat. The sealing disk may be held exclusively by lugs which engage into holes of the bearing seat, or combinations of the above-described retaining arrangement are possible, and therefore in particular a sealing disk which has, in the region of its semicircle ends, lugs which are held in grooves in a parting plane of the bearing seat, and has a further lug approximately in the center of the arc of the sealing disk, which further lug engages into the hole or the bore of the bearing seat.

In particular when a hole or a bore for holding the lug is provided, the hole or the bore is preferably disposed obliquely with respect to the rotational axis of the crankshaft. It is thereby ensured that the lug cannot simply fall out of the hole or the bore. The sealing disk is retained in a particularly secure manner on the bearing seat if the lug makes contact with the bearing seat with a preload.

It is considered to be advantageous if the respective sealing disk has a radial inner edge which is aligned toward the main bearing. Substantial sealing in the direction of the main bearing journal of the crankshaft is obtained in this way. The radial inner edge may be ground as a micro-sealing edge or may be formed as a micro-sealing lip for optimizing the sealing with respect to the main bearing.

The sealing disks which are fastened to the bearing seat thereby seal off the oil channels and the main bearing journal. An emergence of lubricating oil out of the region of the main bearing into the crankcase is thereby prevented or largely prevented. The sealing disks do not make contact with the crank webs, as a result of which the sealing disks are not subjected to any friction wear by parts which move relative thereto.

The sealing disks extend radially inward in particular to such an extent that they end with a minimum spacing to the crankshaft journal which is mounted in the main bearing.

If the sealing disks serve the purpose solely of preventing or substantially preventing an emergence of lubricating oil out of the region of the main bearing into the crankcase, and therefore not of targeted oil recirculation, this necessitates a throttling of the oil flow in the region of the main bearing of the crankshaft. Since the leakage of the main bearing supply is throttled, this leads to a greater oil throughput in the region of the connecting rod bearing of the crankshaft. This results in optimized lubrication of the connecting rod bearing.

With regard to this purely throttled configuration, the bearing encapsulation with oil recirculation must be considered separately. Under this aspect, one refinement of the invention proposes that the oil channels have drains, which are situated at the bottom in the installed position. On account of the sealing disks and the lower drains, splashing losses are reduced, and the oil can flow back more quickly into the oil sump.

The lower drains for the oil have oil channels which are open in particular in the direction of the crankshaft webs and which are covered by covers which are fastened to the sealing disks or to the bearing seat. A particularly simple configuration, which is, moreover, particularly simple to assemble, is generated if the respective cover and the sealing disk which is adjacent thereto are formed in one piece. The cover and the sealing disk are therefore assembled together and in one working step.

Sheet metal is considered to be a preferred material for the sealing disk and/or for the cover. This makes it possible to produce the sealing disk and cover to be of thin-walled construction, with favorable deformation properties, in order to also be able to produce the lugs by simple punching and molding processes.

Other features which are considered as characteristic for the invention are set forth in the appended claims.

Although the invention is illustrated and described herein as embodied in a device for encapsulating a main bearing of a crankshaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
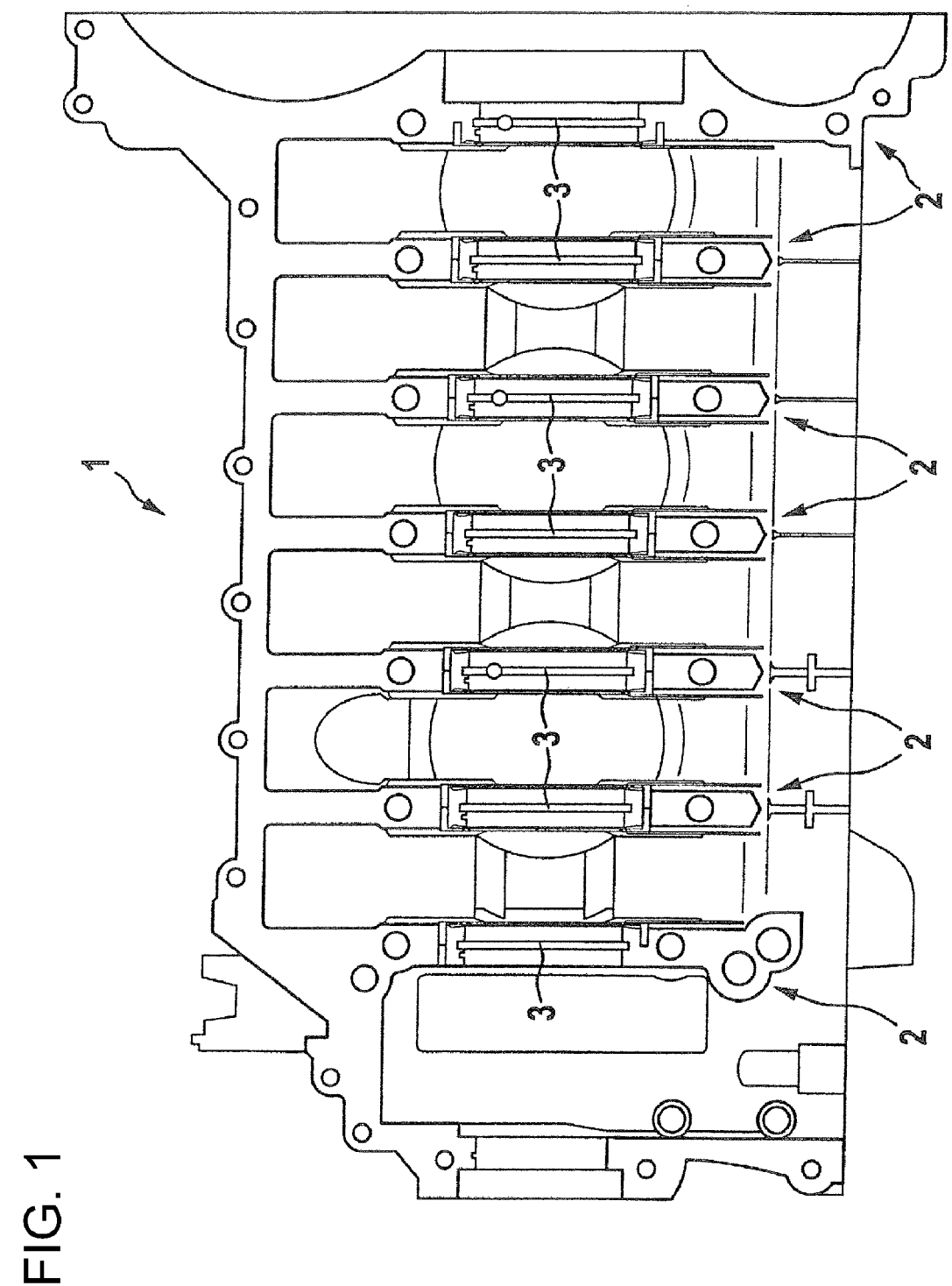
FIG. 1 is a diagrammatic, side view through a crankcase half of an internal combustion engine, which crankcase half is fitted with devices according to the invention for the purpose of optimized lubricating oil discharge.

Referring now to the figures of the drawing in detail and first, particularly, to FIG. 1 thereof, there is shown an internal combustion engine that is a 6-cylinder boxer engine. The crankcase is divided vertically. A respective crankcase half 1 has seven bearing seats 2. The bearing seats of the two crankcase halves hold non-illustrated main bearings in which a non-illustrated crankshaft is mounted in the region of its main bearing journal. The main bearing which is assigned to the bearing seat is supplied with lubricating oil via an oil supply groove 3 in the bearing seat 2. A cutout 4 in the bearing seat 2 serves to position the main bearing.

Figure 2:
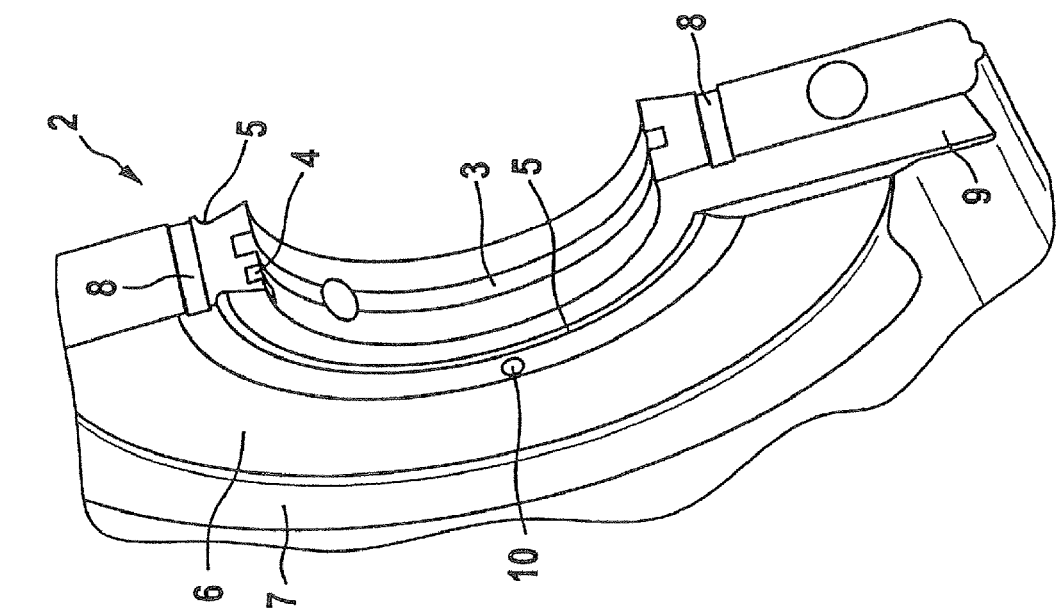
FIG. 2 is a diagrammatic, perspective view of the crankcase shown in FIG. 1, in the region of a bearing seat, shown without sealing disks and covers.

FIG. 2 illustrates, for the one bearing seat 2 which is shown, that the bearing seat 2 is provided on its two axial end sides, therefore on its sides which face toward the crank webs of the crankshaft, with radially inner oil channels 5, which are therefore open in the direction of the main bearing, and the axial oil channels 5, which are therefore open in the direction of the crankshaft webs. The oil channels 5 extend in each case over a semicircle. Radially at the outside, the respective oil channel 5 is adjoined by a semicircular annular section 6, which is slightly recessed with respect to the radially adjoining surface 7 of the bearing seat 2. The crankcase half 1 has, in the region of the respective bearing seat 2 in the region of the parting plane thereof to the bearing seat of the other crankcase half, and at both sides of the oil supply groove 3, an axially running groove 8 whose depth is relatively small and corresponds to the depth of the offset of the annular section with respect to the surface 7.

With respect to the installation position of the crankcase, the respective bearing seat 2 has, at the bottom and at both sides, an oil channel 9 which is open axially and in the direction of the corresponding bearing seat of the other crankcase half. The depth of the oil channel 9 with respect to the surface 7 corresponds to the depth of the oil channel 5 with respect to the surface 7.

A bore 10 is formed in the bearing seat 2 in the region of the annular section 6 approximately in the center of the arc, which bore 10 is disposed obliquely with respect to the rotational axis of the crankshaft, aligned with a component radially outward proceeding from the bore inlet.

Figure 5:
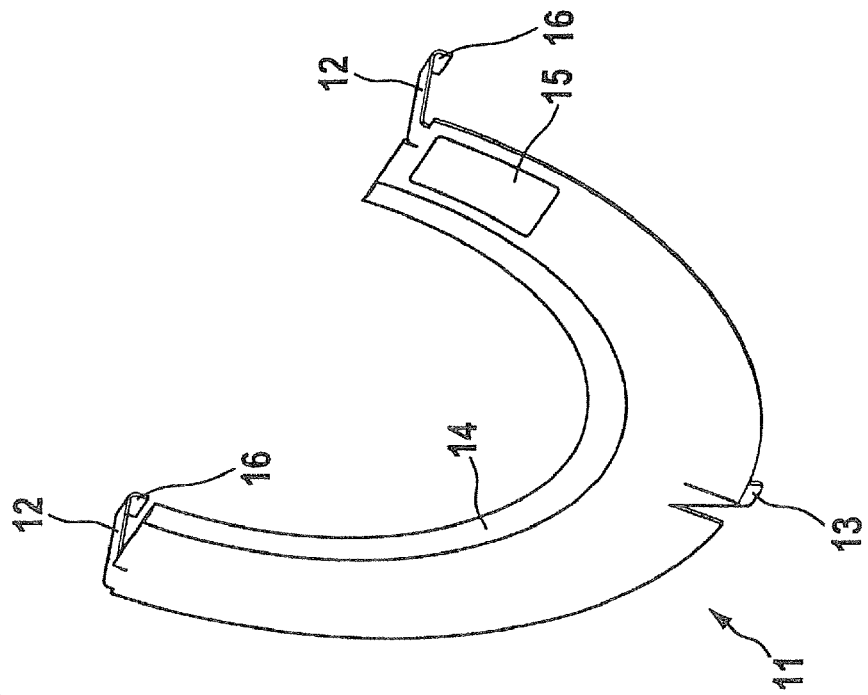
FIG. 5 is a diagrammatic, perspective view of the sealing disk.

A sealing disk 11 serves to cover the respective oil channel 5 and the annular section 6, which sealing disk 11 is illustrated in detail in FIG. 5. The sealing disk is composed of sheet metal. The sealing disk extends over a semicircle and has lugs 12 in the region of its semicircle ends. The lugs 12 are disposed perpendicular to the main surface of the sealing disk 11 and in the same direction. In the region of the center of the arc, the sealing disk 11 has, in the radially outer region, a lug 12 which is bent obliquely out of the main plane. At the radially inner semicircle periphery, the sealing disk 11 is formed as a micro-sealing lip or preferably as a ground micro-sealing edge 14. Radially at the inside, the micro-sealing edge 14 is aligned slightly axially, in the direction of the lugs 12. Adjacent to the one lug 12, the sealing disk 11 is provided with a window 15 of rectangular cross section.

Figure 3:
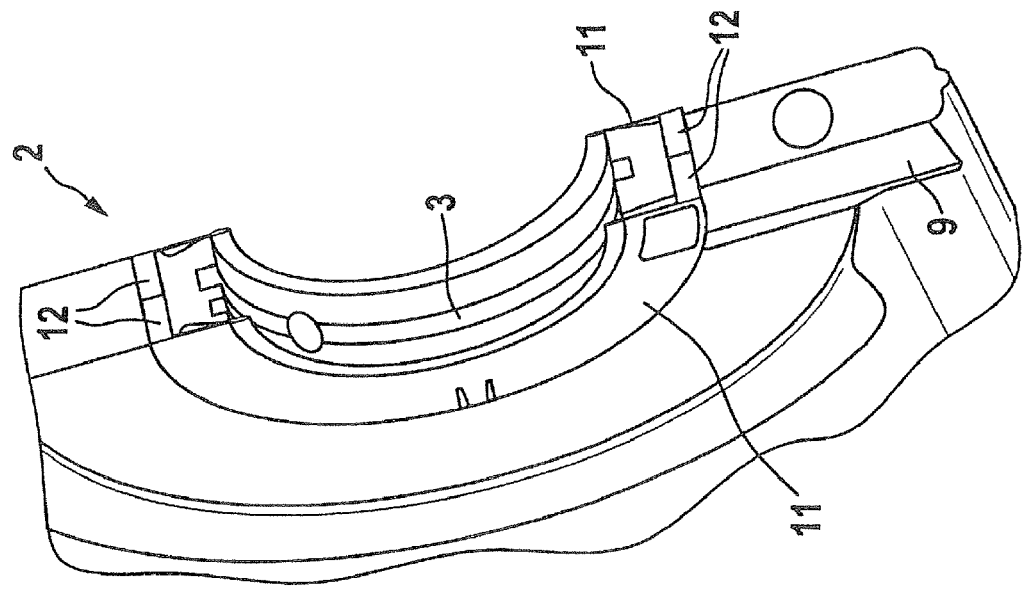
FIG. 3 is a diagrammatic, perspective view as per FIG. 2, shown with the sealing disks.

Proceeding from the state in FIG. 2, FIG. 3 illustrates the two sealing disks 11 which are connected to the crankcase half 1 in the region of the one bearing seat 2. The respective sealing disk 11 bears against the recessed surface 7 of the bearing seat, and the lugs 12 are inserted into the grooves 8 of the bearing seat 2; furthermore, a lug 13 is inserted into the bore 10 in the bearing seat 2. As a result of the oblique initial position of the lug 13, the sealing disk 11 is held in the bearing seat 2 with a preload. Bent-back projections 16 in the region of the free ends of the lugs 12 are inserted into depressions in the grooves 8, such that the sealing disk is fixedly held in the bearing seat 2.

On account of the arrangement of the respective sealing disk 11 with respect to the bearing seat 2, the assigned oil channel 5 is sealed off in the direction of the crankshaft webs. Here, the sealing disk 11 does not make contact with the crank web.

Figure 4:
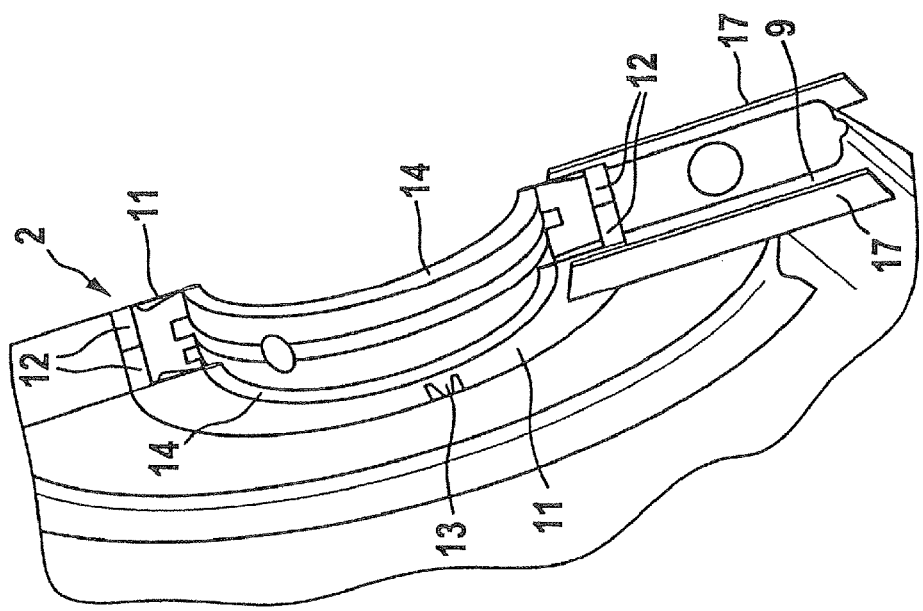
FIG. 4 is a diagrammatic, perspective view as per FIGS. 2 and 3, shown with the sealing disks and the covers.

The respective sealing disk 11 is mounted such that, with respect to the installation position, the window 15 is arranged at the bottom. FIG. 4 illustrates that the oil channel 9 which forms the lower drain for the oil is covered by an elongate cover 17 which is likewise produced from sheet metal. The cover is hooked into the window 15 and is if appropriate additionally connected in the region of its lower end to the bearing seat 2. It is equally conceivable to form the respective sealing disk 11 and the cover 17 in one piece, as a result of which the component has a semicircular section and an adjoining radial section. A drainage slot for oil is formed between the oil channel 9 and the cover 17. If the two crankcase halves and the main bearing and the crankshaft are assembled, and if the bearing seats 2 are provided with the covers according to the invention, the interaction of the sealing disks 11 with the crankcase halves 1 generates a closed oil channel which is covered by two sealing disks 11; in addition, the oil channels 9 of the two crankcase halves are covered in the region of the sealing disk 11, which is arranged on one side of the bearing seat 2, by the two covers 17 which are connected to the sealing disks. The sealing disks 11 seal off with respect to the main bearing journal in a non-contact fashion with a sealing gap by their micro-sealing edges or sealing lips 14. This ensures sealing closure of the bearing seat in the region of the respective main bearing, and a sealed outflow of the oil downward from the main bearing.

Figure 7:
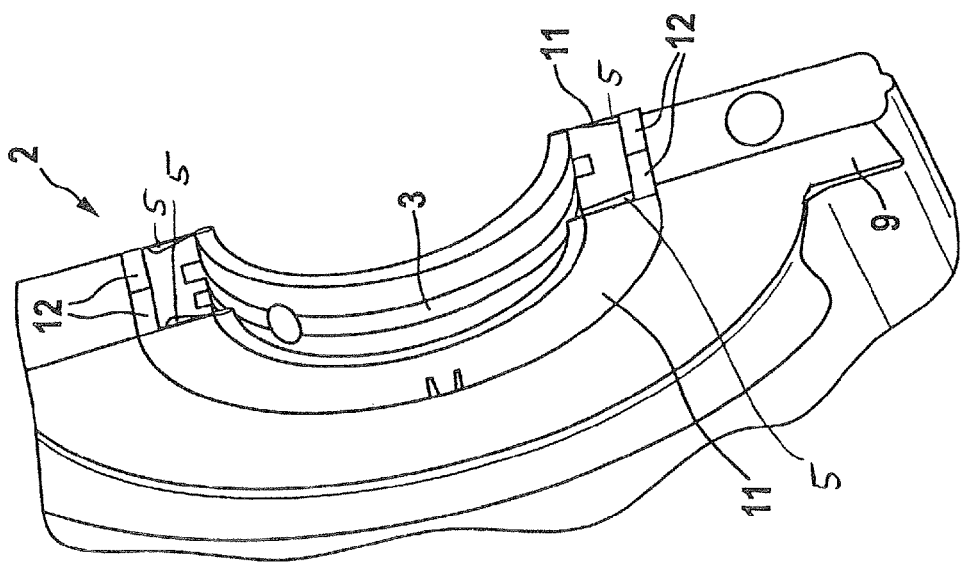
FIG. 7 is a diagrammatic, perspective view of two sealing disks as per FIG. 5 in a crankcase half which does not have an oil outflow.
Figure 6:
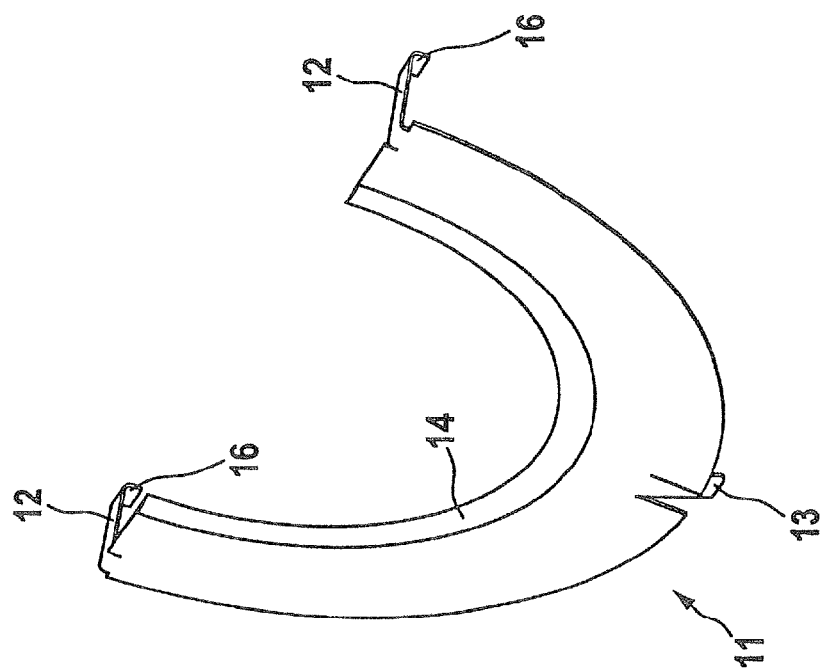
FIG. 6 is a diagrammatic, perspective view of a modified sealing disk, in an illustration corresponding to FIG. 5.

The embodiment as per FIGS. 6 and 7 relates to the use of the device for encapsulating the main bearing of the crankshaft under the aspect of throttling the lubricating oil which is supplied to the main bearing, and therefore not under the aspect of the targeted oil discharge described as per the embodiment of FIGS. 1 to 4. In order to optimally encapsulate the main bearing and the region of the bearing seat 2 which surrounds it, the sealing disk 11 described in FIG. 5 is modified in such a way that it does not have a window 15. No cover 17 is provided either. The bearing seat 2, as can be seen from the illustration of FIG. 7, does not have an oil channel 9. In the embodiment as per FIGS. 6 and 7, in which the main bearing is encapsulated and therefore the leakage of the main bearing supply is throttled, a higher oil throughput is obtained in the connecting rod bearing of the crankshaft, and therefore an improved lubricating effect is obtained in the connecting rod bearing.

As can be seen from the illustration of FIG. 7, in the region of the bearing seat 2 of the crankcase half 1 which is shown, two sealing disks 11 are connected to the bearing seat 2, as is the case in the first embodiment. Here, each sealing disk 11 has the two lugs 12. It is by all means conceivable to form the two sealing disks 11 in one piece, therefore in the manner of a double clip. In this case, the separation between the two sealing disks 11 between the lugs 12 is dispensed with; the sealing disks 11 are therefore connected.

The invention claimed is:

1. A device for encapsulating a main bearing of a crankshaft, the device comprising:
    a bearing seat for receiving the main bearing, said bearing seat having an oil supply groove formed therein for supplying oil to the main bearing, said main bearing having sides facing toward crank webs of the crankshaft, said sides having oil channels formed therein opening in a direction of the main bearing and in a direction of the crankshaft webs; and
    sealing disks covering said oil channels in the direction of the crankshaft webs and fastened to said bearing seat.

2. The device according to claim 1, wherein each of said sealing disks extends over a semicircle defining semicircle ends.

3. The device according to claim 2, wherein each of said sealing disks is held in a region of said semicircle ends in said bearing seat.

4. The device according to claim 3, wherein:
    said bearing seat has a parting plane with grooves formed therein; and
    said sealing disks each have, in said region of said semicircle ends, lugs engaging in said grooves in said parting plane of said bearing seat.

5. The device according to claim 4, wherein said lugs makes contact with said bearing seat with a preload.

6. The device according to claim 2, wherein said two sealing disks which are assigned to one bearing half are formed in one piece.

7. The device according to claim 1, wherein:
    said bearing seat has a hole formed therein; and
    each of said sealing disks has at least one lug, with said lug engaging into said hole of said bearing seat.

8. The device according to claim 7, wherein said hole is disposed obliquely with respect to a rotational axis of the crankshaft.

9. The device according to claim 7, wherein said hole is a bore of said bearing seat.

10. The device according to claim 7, wherein said lug makes contact with said bearing seat with a preload.

11. The device according to claim 1, wherein each of said sealing disks has a radial inner edge aligned toward the main bearing.

12. The device according to claim 11, wherein said radial inner edge is formed as a micro-sealing edge for sealing off with respect to the main bearing.

13. The device according to claim 12, wherein said micro-sealing edge is one of a ground micro-sealing edge and a micro-sealing lip.

14. The device according to claim 11, wherein each of said sealing disks seals off in the direction of the main bearing in a non-contact fashion.

15. The device according to claim 1, wherein said oil channels have drains, which are situated at a bottom in an installed position, for the oil.

16. The device according to claim 15,
    wherein said drains have oil channels formed therein that open in the direction of the crankshaft webs; and
    further comprising covers covering said oil channels and fastened to at least one of said sealing disks and said bearing seat.

17. The device according to claim 16, wherein each of said covers and said one of said sealing disks adjacent thereto are formed in one piece.

18. The device according to claim 16, wherein at least one of said sealing disks and said covers are metal sheets.

* * * * *